United States Patent
Parekh et al.

(10) Patent No.: US 11,716,250 B2
(45) Date of Patent: *Aug. 1, 2023

(54) NETWORK SCALE EMULATOR

(71) Applicant: Cisco Technology, Inc., San Jose, CA (US)

(72) Inventors: Jigar Dinesh Parekh, Fremont, CA (US); Vinay Prabhu, Milpitas, CA (US); Sarah Adelaide Evans, San Jose, CA (US); Suraj Rangaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,153

(22) Filed: Jan. 20, 2022

(65) Prior Publication Data
US 2022/0150119 A1   May 12, 2022

Related U.S. Application Data

(63) Continuation of application No. 16/590,948, filed on Oct. 2, 2019, now Pat. No. 11,252,030.

(51) Int. Cl.
*H04L 41/0816* (2022.01)
*H04L 41/0893* (2022.01)
(Continued)

(52) U.S. Cl.
CPC ...... *H04L 41/0816* (2013.01); *H04L 41/0893* (2013.01); *H04L 41/12* (2013.01); *H04L 45/74591* (2022.05)

(58) Field of Classification Search
CPC . H04L 41/0816; H04L 41/0893; H04L 41/12; H04L 45/74591; H04L 41/0894;
(Continued)

(56) References Cited

U.S. PATENT DOCUMENTS 9,600,386 B1   3/2017   Thai et al.
10,205,661 B1   2/2019   Shukla et al.
(Continued)

FOREIGN PATENT DOCUMENTS

CN   106301911 B   6/2019

OTHER PUBLICATIONS

Dao, Lianjie, et al., "Towards High Fidelity Network Emulation," Jul. 2017, 11 pages.
(Continued)

*Primary Examiner* — Harry H Kim
(74) *Attorney, Agent, or Firm* — Polsinelli

(57) ABSTRACT

Systems, methods, and computer-readable media for scaling a source network. A system may be configured to receive a network configuration for a source network, wherein the source network comprising a plurality of nodes, receive a scale target for a scaled network, and identify, based on the scale target, one or more selected nodes in the plurality of nodes in the source network for implementing in the scaled
(Continued)

network. The system may further be configured to reconfigure data plane parameters and control plane parameters for each node in the one or more selected nodes.

20 Claims, 8 Drawing Sheets

(51) Int. Cl.
*H04L 41/12* (2022.01)
*H04L 45/745* (2022.01)
*H04L 41/0895* (2022.01)
*H04L 41/0894* (2022.01)
*H04L 41/0897* (2022.01)
*H04L 41/122* (2022.01)
*H04L 41/40* (2022.01)
*H04L 41/0213* (2022.01)
*H04L 45/18* (2022.01)

(58) Field of Classification Search
CPC ............. H04L 41/0895; H04L 41/0897; H04L 41/122; H04L 41/40; H04L 41/0213; H04L 45/18
See application file for complete search history.

(56) References Cited

U.S. PATENT DOCUMENTS

| | | | | |
|---|---|---|---|---|
| 11,252,030 | B2* | 2/2022 | Parekh | ................... H04L 41/40 |
| 2009/0201832 | A1* | 8/2009 | Brown | ................... H04L 41/12 |
| | | | | 370/254 |
| 2009/0268740 | A1* | 10/2009 | Sindhu | .................. H04L 49/108 |
| | | | | 370/392 |
| 2012/0239799 | A1* | 9/2012 | Wang | ................... H04L 41/145 |
| | | | | 709/224 |
| 2012/0317610 | A1* | 12/2012 | Kashyap | ............. H04L 63/0272 |
| | | | | 726/13 |
| 2016/0261482 | A1* | 9/2016 | Mixer | ..................... H04L 43/12 |
| 2018/0337830 | A1 | 11/2018 | Padhye et al. | |
| 2019/0340376 | A1* | 11/2019 | Fleck | ....................... G06F 16/27 |
| 2020/0252278 | A1* | 8/2020 | Hankins | .............. H04L 12/1836 |

OTHER PUBLICATIONS

Fontes, Ramon, et al., "Mininet-WiFi: Emulating Software-Defined Wireless Networks," Nov. 2015, 6 pages.

* cited by examiner

| | Parameters | Source Network | Scaled Network (Down by a factor of 10) | Scaled Network (Up by a factor of 10) |
|---|---|---|---|---|
| Data Plane | Hello Timer | 1 second | 0.1 seconds | 10 seconds |
| | BFD Hello Tolerance | 10 seconds | 1 second | 100 seconds |
| | IPSEC Rekey timer | 3600 | 360 | 36000 seconds |
| | Enable/Disable Double Encapsulation | 1 | 2 | 1 |

FIG. 5

|  | Parameters | Source Network | Scaled Network (Down by a factor of 10) | Scaled Network (Up by a factor of 10) |
|---|---|---|---|---|
| Control Plane | Control Connections per LAN interface (TLOC) |  |  |  |
|  | Affinity towards controllers | 2 controllers per group-list | 40 (or up to limit) | 2 controllers per group-list |
|  | Advertised Routes | 50,000 | Assign all group-lists to the node | 50,000 |
|  | Restrict | Restrict | 500000 (max of 128k) | Restrict |
|  | TLOC-Group | Per customer setup | No restrict | Per customer setup |
|  |  |  | Assign tloc-group on all tlocs to increase BFD sessions |  |
|  | OMP Timer - Rekey | 43200 | 4320 | 432000 (max of 604800) |

FIG. 6

NETWORK SCALE EMULATOR

CROSS-REFERENCE TO RELATED APPLICATION

This application is a continuation of U.S. Non-Provisional patent application Ser. No. 16/590,948, filed Oct. 2, 2019, the content of which is hereby expressly incorporated by reference in its entirety.

TECHNICAL FIELD

The subject matter of this disclosure relates in general to the field of computer networking, and more particularly, systems and methods for scaling a network.

BACKGROUND

Deployed networks are becoming increasing large and complicated. The networks may include a large number of nodes or other entities, include a wide variety of types of entities, and each of the entities may communicate or be managed by different schemes and protocols. Furthermore, after deployment, the configuration of the various devices in a network may be updated over time, often by different individuals that may not have a holistic view of the network. Each network also experiences different traffic patterns that may change over time based on schedule and/or usage. These and other factors make understanding all the different dimensions and characteristics of a deployed network (e.g., an enterprise network) difficult to fully understand.

There are several reasons to scale up or scale down a network. For example, a company may be expanding and need to expand an enterprise network, extend the network to one or more branches or campuses, add one or more data centers, or the like. Accordingly, the network may need to be scaled up to accommodate the expansion. A network may also need to be scaled down in some cases, such as in the unfortunate circumstance where a company contracts. Furthermore, in some cases, a small reproduction of a network environment may be desirable in order to reproduce bugs, validate topology, demonstrate the viability of a feature, test the performance of the network, learn more about characteristics of the network, or for various other reasons.

BRIEF DESCRIPTION OF THE FIGURES

To provide a more complete understanding of the present disclosure and features and advantages thereof, reference is made to the following description, taken in conjunction with the accompanying drawings, in which:

FIG. 5 is a chart illustrating an example scheme for reconfiguring data plane parameters, in accordance with various aspects of the subject technology;

FIG. 6 is a chart illustrating an example scheme for reconfiguring control plane parameters, in accordance with various aspects of the subject technology;

DESCRIPTION OF EXAMPLE EMBODIMENTS

Figure 1:
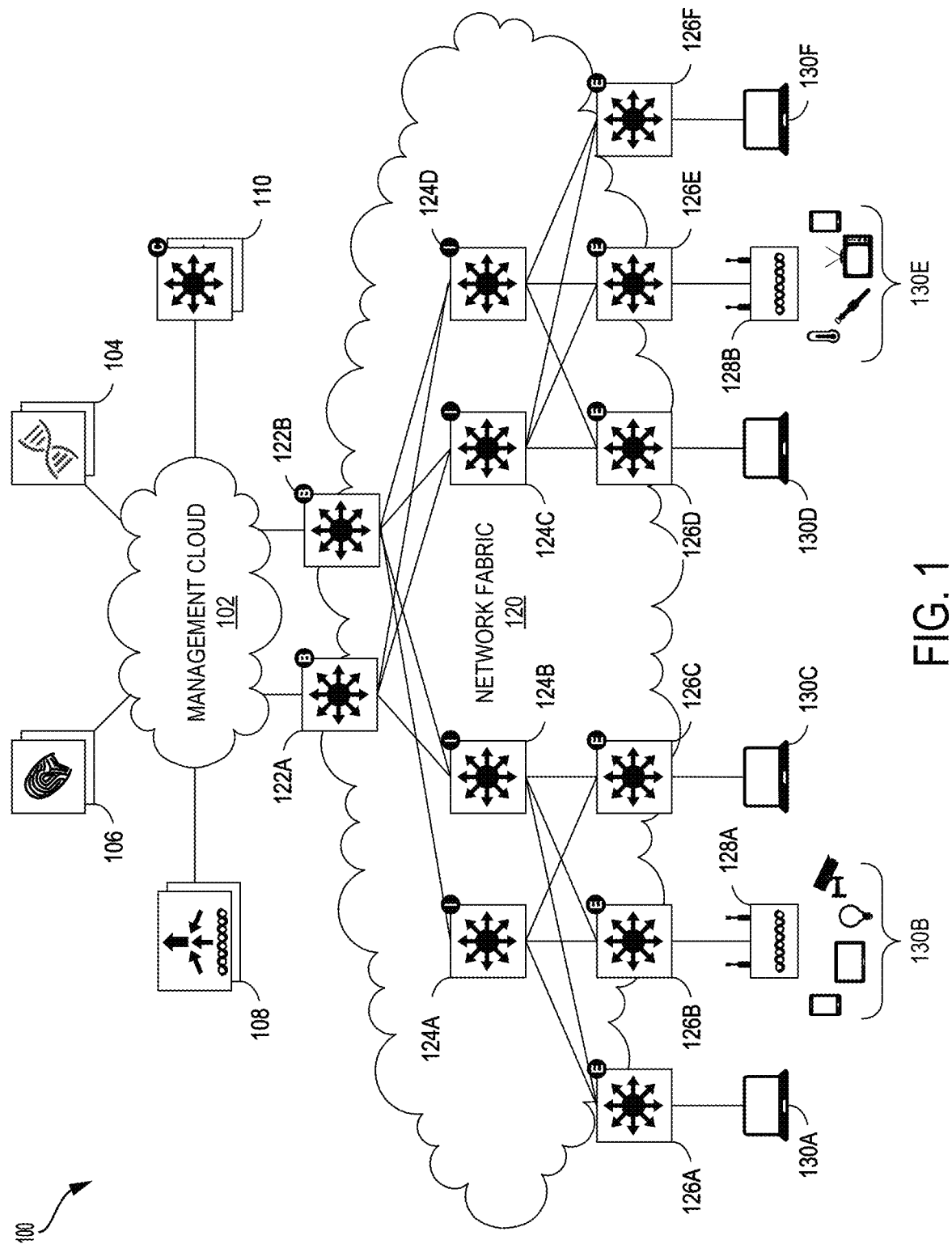
FIG. 1 illustrates an example of a topology of a network, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Various aspects of the subject technology relate to systems, methods, and computer-readable media for scaling a source network.

For example, a method can include receiving a network configuration for a physical network and a scale target for a scaled network, wherein the physical network comprising a plurality of nodes, identifying, based on the scale target, one or more selected nodes in the plurality of nodes in the physical network for implementing in the scaled network, reconfiguring, for each node in the one or more selected nodes, data plane parameters for the node, and reconfiguring, for each node in the one or more selected nodes, control plane parameters for the node. At least one of the data plane parameters or the control plane parameters may be reconfigured based on the scale target. The method can further include deploying the scaled network.

In some embodiments, the scale target comprises one of a scale factor or a target number of nodes. The one or more selected nodes may be identified based on one or more topologies of the physical network. The method may further include performing a route loop avoidance check. The data plane parameters may include at least one of a hello timer, an internet protocol security rekey timer, a bidirectional forwarding detection parameters, or a encapsulation parameters. The control plane parameters may include at least one of a control connection parameter, an advertised route parameter, a restriction parameter, a transport location (TLOC) group parameter, or an overlay management protocol (OMP) timer rekey parameter.

The method may further include reconfiguring, for each node in the one or more selected nodes, policy design parameters for the node. Reconfiguring of policy design parameters may include adding placeholder entries to a Ternary Content-Addressable Memory (TCAM) of the node. The placeholder entries may be added to a beginning of the Ternary Content-Addressable Memory (TCAM) of the node.

In some examples, a system may be configured to receive a network configuration for a source network, wherein the source network comprising a plurality of nodes, receive and a scale target for a scaled network, and identify, based on the scale target, one or more selected nodes in the plurality of nodes in the source network for implementing in the scaled network. The system may further be configured to reconfigure data plane parameters and control plane parameters for each node in the one or more selected nodes.

In some examples, a non-transitory computer-readable storage medium may have stored therein instructions which, when executed by a processor, cause the processor to perform operations. The operations may include receiving a network configuration for a source network, wherein the source network comprising a plurality of nodes, receiving and a scale target for a scaled network, identifying, based on the scale target, one or more selected nodes in the plurality of nodes in the source network for implementing in the scaled network, and reconfiguring data plane parameters and control plane parameters for each node in the one or more selected nodes.

EXAMPLE EMBODIMENTS

As noted above, there are various reasons to scale up or scale down a network. In a example scenario, a network may need to grow or shrink in response to a changing business environment, but maintain roughly the same performance, functionality, and characteristics. In other scenarios, test engineers may wish to create a smaller or bigger reproduction of a network environment to test network behaviors, reproduce bugs, validate topology, demonstrate the viability of a feature, learn more about characteristics of the network, or for various any other reasons.

However, accurately scaling up or scaling down a network in a way that approximates the topology, behavior, and other characteristics of the original network is very difficult. For example, a scaled network that merely increases (to scale up) or decreases (to scale down) the number of entities or nodes in a network while maintaining other characteristics of the network fails to take into consideration important characteristics such as various aspects of network load and network topology.

Aspects of the subject technology relate to a network scale emulator system configured to intelligently scale a network. The scaling of the network may not only take into consideration the number of nodes (e.g., entities) in the scaled network, but also maintain the fidelity of the topology network elements and traffic characteristics experienced by the network. Among other benefits, the network scale emulator system greatly reduces complex customer network replication efforts for proof of concepts and debugging wide range of customer specific use cases with less background on topology, scale, and stress level parameters.

Although the network scale emulator system can work with a variety of different network types, various aspects of the subject technology will be discussed with respect to example software-defined networking in a wide area networks (SDWANs).

The disclosure now turns to FIG. 1, which illustrates an example of a topology of a network 100 for providing intent-based networking. In the network 100 and any network discussed herein, there can be additional or fewer nodes, devices, links, networks, or components in similar or alternative configurations. Other example implementations with different numbers and/or types of endpoints, nodes, cloud components, servers, software components, devices, virtual or physical resources, configurations, topologies, services, or deployments are also contemplated herein. The network 100 (e.g., the network fabric 120) may be include one or more topologies including, for example, hub-and-spoke topologies, mesh topologies, ring topologies, bus topologies, star topologies, hybrid topologies, or the like. Further, the network 100 can include any number or type of resources, which can be accessed and utilized by endpoints or network devices. The illustrations and examples provided herein are for clarity and simplicity.

In this example, the network 100 can include a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configurations and policy distribution, as well as device management and analytics. The management cloud 102 can include one or more network controller appliances 104; one or more authentication, authorization, and accounting (AAA) appliances 106; one or more wireless local area network controllers (WLCs) 108; and one or more fabric control plane nodes 110. In other examples, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some examples, one or more Cisco Digital Network Architecture (Cisco DNA™) appliances can operate as the network controller appliance(s) 104. Moreover, in some examples, the network controller appliance(s) 104 can perform analytics and assurance operations.

The AAA appliance(s) 106 can control access to computing resources, facilitate enforcement of network policies, audit usage, and provide information to bill for services. The AAA appliance can interact with the network controller appliance(s) 104 and databases and directories containing information for users, devices, things, policies, billing, and other information to provide authentication, authorization, and accounting services. In some examples, the AAA appliance(s) 106 can utilize Remote Authentication Dial-In User Service (RADIUS) or Diameter to communicate with devices and applications. In some cases, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some examples, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. T his can enable distributed forwarding and distributed policy application for wireless traffic while retaining the benefits of centralized provisioning and administration. In some examples, one or more Cisco® Wireless Controllers, Cisco® Wireless LAN, and/or other Cisco DNA™-ready wireless controllers can operate as the WLC(s) 108.

The network fabric 120 can include border nodes 122A and 122B (collectively "122"), intermediate nodes 124A-D (collectively "124"), and edge nodes 126A-F (collectively "126"). Although the control plane node(s) 110 are shown to be external to the network fabric 120 in this example, in other examples, the control plane node(s) 110 can be co-located with the network fabric 120. In examples where the control plane node(s) 110 are co-located with the network fabric 120, the control plane node(s) 110 can include a dedicated node or set of nodes, or the functionality of the control node(s) 110 can be implemented by the border nodes 122.

The control plane node(s) 110 can serve as a central database for tracking users, devices, and things as they attach to the network fabric 120 and as they roam around. The control plane node(s) 110 can allow network infrastructure (e.g., switches, routers, WLCs, etc.) to query the database to determine the locations of users, devices, and things attached to the fabric instead of using a flood and learn mechanism. In this manner, the control plane node(s) 110 can operate as a single source of truth about where every endpoint attached to the network fabric 120 is located at any point in time. In addition to tracking specific endpoints (e.g., /32 address for IPv4, /128 address for IPv6, etc.), the control plane node(s) 110 can track larger summarized routers (e.g., IP/mask). This flexibility can help summarization across fabric sites and improve overall scalability.

The border nodes 122 can connect the network fabric 120 to traditional Layer 3 networks (e.g., non-fabric networks) or to different fabric sites. The border nodes 122 can translate context (e.g., user, device, or thing mapping and identity) from one fabric site to another fabric site or to a traditional network. When the encapsulation is the same across different fabric sites, the translation of fabric context is generally mapped 1:1. The border nodes 122 can also exchange reachability and policy information with control plane nodes of different fabric sites. The border nodes 122 can provide border functions for internal networks and external networks. Internal borders can advertise a defined set of known subnets, such as those leading to a group of branch sites or a data center. External borders, on the other hand, can advertise unknown destinations (e.g., to the Internet similar in operation to the function of a default route).

The intermediate nodes 124 can operate as Layer 3 forwarders that connect the border nodes 122 to the edge nodes 126 and provide the Layer 3 underlay for fabric overlay traffic.

The edge nodes 126 can connect endpoints to the network fabric 120 and can encapsulate/decapsulate and forward traffic from these endpoints to and from the network fabric. The edge nodes 126 may operate at the perimeter of the network fabric 120 and can be the first points for attachment of users, devices, and things and the implementation of policy. In some examples, the network fabric 120 can include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the edge nodes via Layer 2. Devices or things connected to the fabric extended nodes can use the edge nodes 126 for communication to outside subnets.

In this example, the network fabric can represent a single fabric site deployment which can be differentiated from a multi-site fabric deployment as discussed further below with respect to FIG. 3.

In some examples, the subnets hosted in a fabric site can be provisioned across every edge node 126 in that fabric site. For example, if the subnet 10.10.10.0/24 is provisioned in a given fabric site, this subnet may be defined across all of the edge nodes 126 in that fabric site, and endpoints located in that subnet can be placed on any edge node 126 in that fabric. This can simplify IP address management and allow deployment of fewer but larger subnets. In some examples, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively "130"). The wired endpoints 130A, 130C, 130D, and 130F can connect by wire to edge nodes 126A, 126C, 126D, and 126F, respectively, and the wireless endpoints 130B and 130E can connect wirelessly to wireless access points 128B and 128E (collectively "128"), respectively, which in turn can connect by wire to edge nodes 126B and 126E, respectively. In some examples, Cisco Aironet® access points, Cisco Meraki® MR access points, and/or other Cisco DNA™-ready access points can operate as the wireless access points 128.

The endpoints 130 can include computing devices such as servers, workstations, desktop computers, gaming systems, conferencing systems, mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, etc.); connected cars and other vehicles; smart home sensors and devices (e.g., alarm systems, security cameras, lighting, appliances, media players, HVAC equipment, utility meters, doors, locks, etc.); unmanned aerial vehicles (UAVs); office equipment (e.g., desktop phones, copiers, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, etc.); transportation and logistical equipment (e.g., turnstiles, rental car trackers, navigational devices, inventory monitors, etc.); and so forth.

In some examples, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about wired and wireless endpoints in the network fabric 120, and can serve as the source of truth for endpoints connected to the network fabric. For data plane integration, the WLC(s) 108 can instruct the wireless access points 128 to form an overlay tunnel (e.g., VXLAN) to their adjacent edge nodes 126. The tunnel can carry segmentation and policy information to and from the edge nodes 126, allowing connectivity and functionality identical or similar to that of a wired endpoint. When the wireless endpoints 130 join the network fabric 120 via the wireless access points 128, the WLC(s) 108 can onboard the endpoints into the network fabric 120 and inform the control plane node(s) 110 of the endpoints' Media Access Control (MAC) addresses. The WLC(s) 108 can then instruct the wireless access points 128 to form overlay tunnels to the adjacent edge nodes 126. The wireless endpoints 130 can obtain IP addresses for themselves via Dynamic Host Configuration Protocol (DHCP). Once that completes, the edge nodes 126 can register the IP addresses of the wireless endpoints 130 to the control plane node(s) 110 to form a mapping between the endpoints' MAC and IP addresses, and traffic to and from the wireless endpoints 130 can begin to flow.

Figure 2:
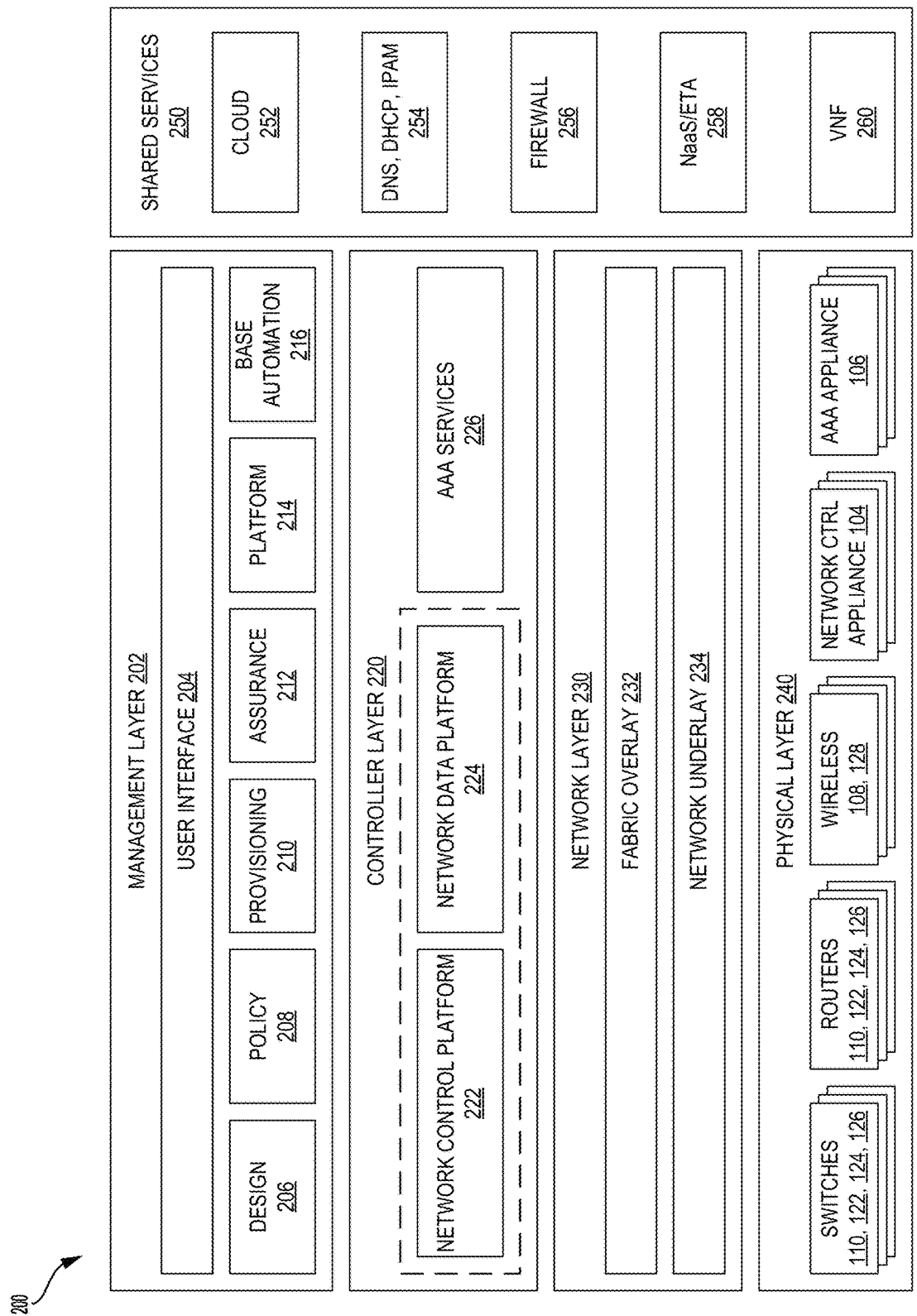
FIG. 2 illustrates an example of a logical architecture for an enterprise network, in accordance with various aspects of the subject technology.

FIG. 2 illustrates an example of a logical architecture 200 for a network (e.g., the network 100). One of ordinary skill in the art will understand that, for the logical architecture 200 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the logical architecture 200 includes a management layer 202, a controller layer 220, a network layer 230 (such as embodied by the network fabric 120), a physical layer 240 (such as embodied by the various elements of FIG. 1), and a shared services layer 250. The management layer 202 can abstract the complexities and dependencies of other layers and provide a user with tools and workflows to manage a network (e.g., the network 100). The management layer 202 can include a user interface 204, design functions 206, policy functions 208, provisioning functions 210, assurance functions 212, platform functions 214, and base automation functions 216.

The user interface 204 can provide a user a point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 can also provide visibility information, such as views of a network, network infrastructure, computing devices, and things. For example, the user interface 204 can provide a view of the status or conditions of the network, operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some examples, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

The controller layer 220 can include subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers (230, 240). For example, the network control platform 230 can provide the design functions 206, the policy functions 208, and the provisioning functions 210. In addition, the network control platform 222 can include tools and workflows for discovering switches, routers, wireless controllers, and other network infrastructure devices; maintaining network and endpoint details, configurations, and software versions; Plug-and-Play (PnP) for automating deployment of network infrastructure, Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others.

The network control platform 222 can communicate with network elements using, for example and without limitation, Network Configuration (NETCONF)/Yet Another Next Generation (YANG), Simple Network Management Protocol (SNMP), Secure Shell (SSH)/Telnet, and so forth. In some examples, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices including, for example, syslog, SNMP, NetFlow, Switched Port Analyzer (SPAN), and streaming telemetry, among others. The network data platform 224 can also collect and use contextual information from the network control platform 222, the shared services 250, among others.

In some examples, one or more appliances, such as one or more Cisco DNA™ Center appliances, can provide the functionalities of the management layer 210, the network control platform 222, and the network data platform 224. The appliances (e.g., Cisco DNA™ Center appliances) can support horizontal scalability by adding additional nodes (e.g., Cisco DNA™ Center nodes) to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. In some cases, the appliances (e.g., Cisco DNA™ Center appliances) can be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and create group-based policies and contracts. The AAA services 226 can identify and profile network infrastructure devices and endpoints using, for example, AAA/RADIUS, 802.1X, MAC Authentication Bypass (MAB), web authentication, and EasyConnect, among others. The AAA services 226 can collect and use contextual information from the network control platform 222, the network data platform 224, and the shared services 250, among others. In some examples, Cisco® ISE can provide the AAA services 226.

The network layer 230 can be conceptualized as a composition of two layers, an underlay 234 including physical and virtual network infrastructure (e.g., routers, switches, WLCs, etc.) and a Layer 3 routing protocol for forwarding traffic, and an overlay 232 including a virtual topology for logically connecting wired and wireless users, devices, and things and applying services and policies to these entities. Network elements of the underlay 234 can establish connectivity between each other, such as via Internet Protocol (IP). The underlay 234 can use any topology and routing protocol.

In some examples, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the protocol and network address configurations to the physical network infrastructure. In some examples, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some examples, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some examples, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement overlay/tunnel (e.g., VXLAN) encapsulation to provide network segmentation by using the virtual network identifier (VNI) and Scalable Group Tag (SGT) fields in packet headers. The network fabric 120 can support macro-segmentation and micro-segmentation.

Macro-segmentation logically separates a network topology into smaller virtual networks by using a unique network identifier and separate forwarding tables. This can be instantiated as a virtual routing and forwarding (VRF) instance, for example, and referred to as a virtual network (VN). A VN is a logical network instance within the network fabric 120 defined by a Layer 3 routing domain and can provide both Layer 2 and Layer 3 services (e.g., using the VXLAN VNI to provide both Layer 2 and Layer 3 segmentation).

Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some examples, the control plane node 110 can implement the Locator/Identifier Separation Protocol (LISP) to communicate with one another and with the management cloud 102. Thus, the control plane nodes 110 can operate a host tracking database, a map server, and a map resolver. The host tracking database can track the endpoints 130 connected to the network fabric 120 and associate the endpoints to the edge nodes 126, thereby decoupling an endpoint's identifier (e.g., IP or MAC address) from its location (e.g., closest router) in the network.

The physical layer 240 can include network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 3:
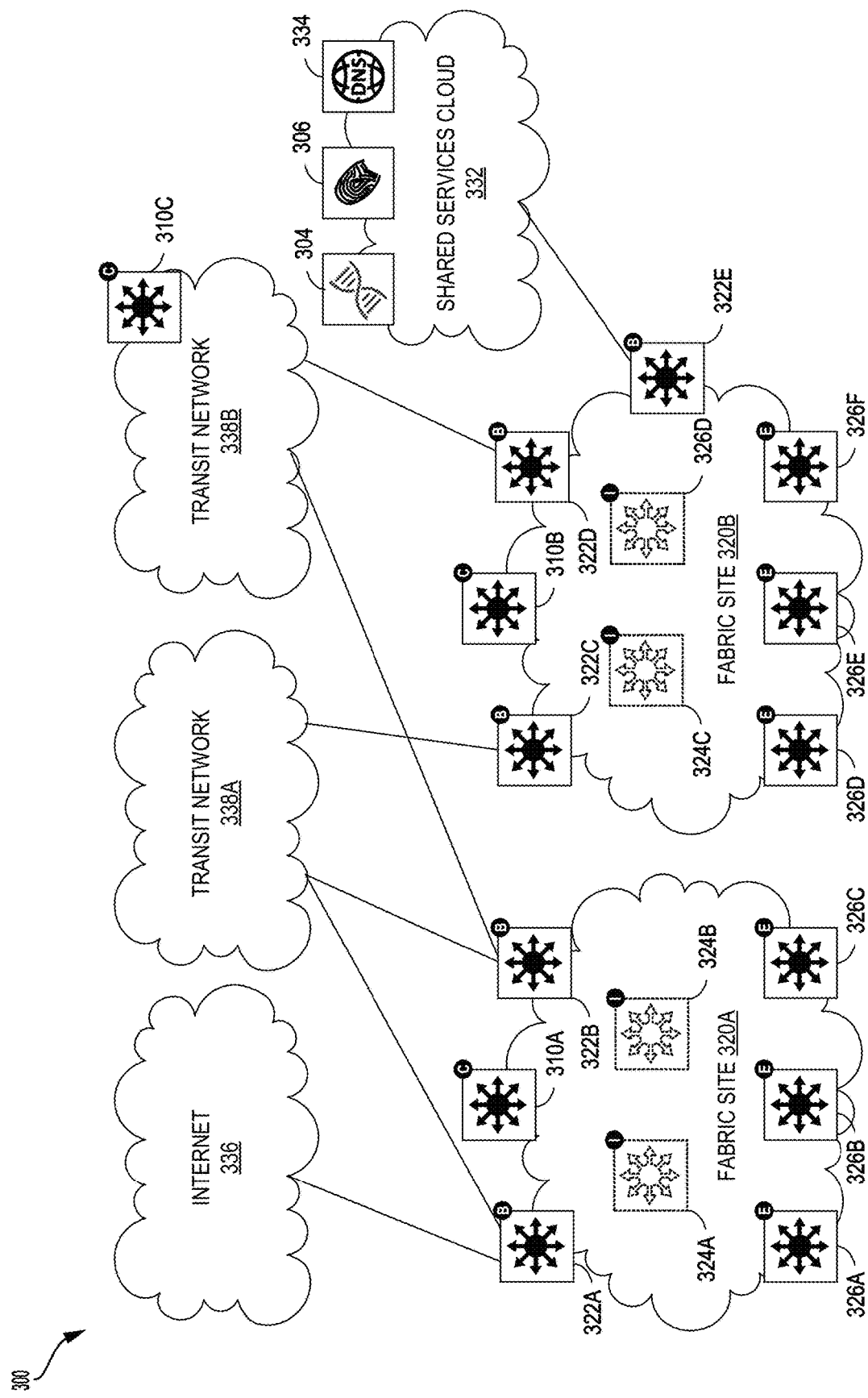
FIG. 3 illustrates an example of a topology of a multi-site network, in accordance with various aspects of the subject technology.

FIG. 3 illustrates an example of a topology of a multi-site network 300. In this example, the network fabric includes fabric sites 320A and 320B. The fabric site 320A can include a control node 310A, border nodes 322A and 322B, intermediate nodes 324A and 324B (shown here in dashed line and not connected to the border nodes or the edge nodes for simplicity), and edge nodes 326A-D. The fabric site 320B can include a fabric control node 310B, border nodes 322C-E, intermediate nodes 324C and 324D, and edge nodes 326D-F. Multiple fabric sites corresponding to a single fabric, such as the network fabric of FIG. 3, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 336, traditional WAN 338A, Software-Defined WAN (SD-WAN) (not shown), or Software-Defined Access (SD-Access) 338B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network can carry endpoint context information (e.g., VRF, SGT) across the network. Otherwise, a re-classification of the traffic can be needed at the destination site border.

The local control plane in a fabric site may hold state relevant to endpoints that are connected to edge nodes within the local fabric site. The local control plane can register local endpoints via local edge nodes, as with a single fabric site (e.g., the network fabric 120). An endpoint that is not explicitly registered with the local control plane may be assumed to be reachable via border nodes connected to the transit network. In some examples, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 300 can also include a shared services cloud 332. The shared services cloud 332 can include one or more network controller appliances 304, one or more AAA appliances 306, and other shared servers (e.g., DNS; DHCP; IPAM; SNMP and other monitoring tools; NetFlow, syslog, and other data collectors, etc.). These shared services can generally reside outside of the network fabric and in a global routing table (GRT) of an existing network. In this case, some method of inter-VRF routing may be performed. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may involve complex distribute-lists and prefix-lists to prevent loops.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are used (e.g., a Shared Services VN, an Internet VN, a data center VN, etc.).

According to various aspects of the subject technology, a network scale emulator system configured to intelligently scale a network such as network 100 or network 300 shown in FIGS. 1 and 3 respectively. Moreover, the network scale emulator can be implemented by one or more network devices and/or appliances. For example, in some cases, the network scale emulator can be implemented by one or more network controller appliances (e.g., 104, 304). In other cases, the network scale emulator may be implemented by a device in a network fabric or another external service.

Aspects of the subject technology relate to a network scale emulator system configured to intelligently generate a scaled network and/or emulate a scaled network. The scaled network is generated based on a network configuration for a network (e.g., an originally designed unscaled network) and maintains the complexity and load of the originally designed network. For example, the scaled network may recreate the topology (e.g., a hub spoke topology, a full-mesh topology, or a hybrid topology) using a non-linear transformation of a control plane policy of the original unscaled network. The non-linear transformation ensures that the topology of the original network is reproduced in the scaled network, the load on the scaled network is not compromised, and the memory and computational footprint of the scaled network is comparable to the original network. According to some embodiments, the network scale emulator can also perform various checks on the scaled network (e.g., route loop avoidance checks) to prevent the scaled network from sharing some of the characteristics of the parent network that are detrimental to network performance.

The network scale emulator takes into account various characteristics of an original network. The characteristics may include, among other things, data plane characteristics, control plane characteristics, and policy design characteristics. The data plane characteristics may include, for example, various timers (e.g., hello timers, IPSEC rekey timers, etc.), communication protocol parameters (e.g., bidirectional forwarding detection parameters), encapsulation parameters, and the like. The control plane characteristics may include, for example, parameters related to control connections per LAN interface, affinity towards controllers, a number of dummy routes, restriction parameters, transport location (TLOC) groups, overlay management protocol (OMP) timer rekey parameters.

Policy design characteristics may include various parameters and steps related to recreating the environment of the original network for each network node in the scaled network. For example, some network nodes may utilize Ternary Content-Addressable Memory (TCAM) to store the hardware level rendering of intents as a series of TCAM entries. However, each node may have a limited amount of TCAM memory and/or may only be able to store a limited number of TCAM entries. Furthermore, the amount of TCAM memory utilized on a network node affects the load and compute overhead of the network node. When scaling down a network, some of the TCAM entries are removed for nodes no longer in the scaled down network. To compensate, the network scale emulator is configured to add placeholder (or dummy) TCAM entries to emulate similar network conditions. Furthermore, the TCAM entries may be added to the top or beginning of the TCAM memory since some network nodes process TCAM entries sequentially and adding the placeholder TCAM entries to the beginning of TCAM memory helps to simulate the network conditions of the original network.

Figure 4:
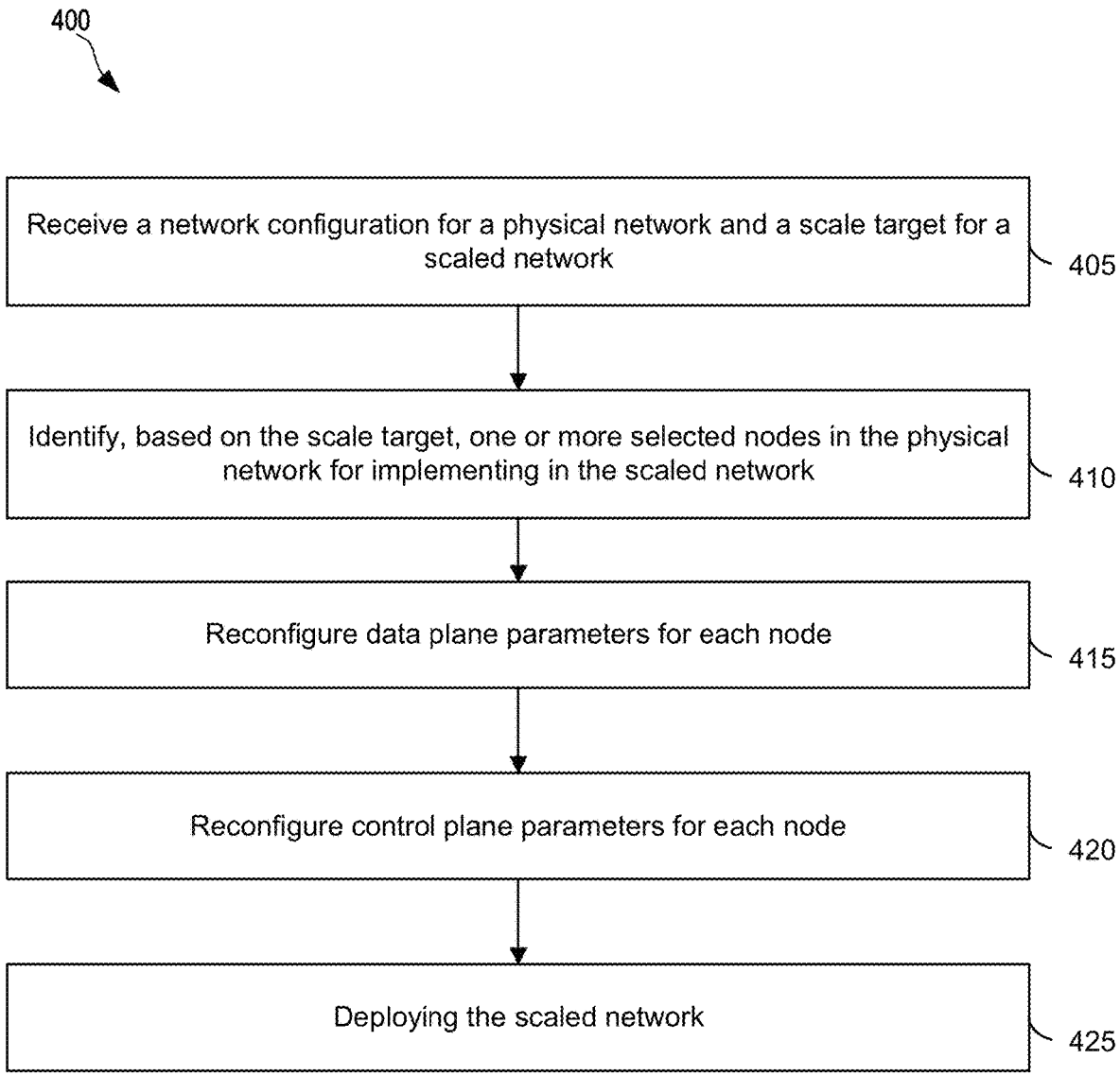
FIG. 4 is a flow diagram illustrating a method for generating and deploying a scaled network, in accordance with various aspects of the subject technology.

FIG. 4 is a flow diagram illustrating a method 400 for generating and deploying a scaled network, in accordance with various aspects of the subject technology. The steps outlined in method 400 are shown for illustrative purposes. Other embodiments can be implemented in other combinations of steps, including combinations that exclude, add, or modify certain steps.

At step 405, a network scale emulator (e.g., a system) may receive a network configuration for a physical network and a scale target for a scaled network. The physical network may be a source network that the scaled network is to be based on and the physical network comprising a number of nodes. Each node may be a router, switch, or other entity (e.g., device, service, etc.) in the network. The network configuration may be in the form of a policy configuration (e.g., control policies) for the physical network retrieved from a network controller appliance (e.g., network controller appliances 104 of FIG. 1 or 304 of FIG. 3). The scale target may be received via input from a network administrator or from another system. The scale target may be a scale factor (e.g., scaled up by a factor of 2, scaled down by a factor of 10, or some other factor value), a target number of nodes (e.g., 50 nodes), or another value that specifies how the source network is to be scaled.

At step 410, the network scale emulator identifies, based on the scale target, one or more selected nodes in the plurality of nodes in the physical network for implementing in the scaled network. For example, if a source network included 100 nodes and the scale target was to scale down the source network by a factor of 5, the resulting number of nodes in the scaled network would be 20. If, on the other hand, the scale target was to scale up the source network by a factor of 2, the resulting number of nodes in the scaled network would be 200. According to some embodiments, the deployment of the nodes selected for inclusion in the scaled network may be similar to the deployment of the nodes in the source network. For example, the topologies found in the source network may be represented and recreated to an extent in the scaled network.

At step 415, each of the nodes selected to be included in the scaled network may have their data plane parameters reconfigured. The data plane parameters may include parameters for the various data plane protocols implemented on each node. For example, the data plane parameters may include parameters for various hello protocols (e.g., bidirectional forwarding detection), Internet Protocol Security (IPSEC) parameters, encapsulation parameters, and the like.

FIG. 5 is a chart illustrating an example scheme for reconfiguring data plane parameters, in accordance with various aspects of the subject technology. The parameters outlined in the chart of FIG. 5 are shown for illustrative purposes. Other embodiments can be implemented in other combinations of parameters, including combinations that exclude, add, or modify certain parameters. FIG. 5 shows how a list of example data plane parameters 505 may be configured. For example, the values for the data plane parameters for a node in a source network are shown in column 510. In an example, scenario, the hello timer for the node is set to 1 second, the bidirectional forwarding detection (BFD) hello tolerance is set to 10 seconds, the IPSEC rekey timer is set to 3600 seconds, and double encapsulation is disabled.

The data plane parameters for nodes selected for inclusion in the scaled network should be adjusted to allow the scaled network to better emulate the conditions in the source network. Furthermore, the data plane parameters are adjusted based on the scale factor to more accurately reconfigure the data plane parameters of each node. For example, in the example scheme illustrated in FIG. 5, the corresponding node selected for inclusion in a scaled network to be scaled down by a factor of 10 may have the hello timer for the node adjusted to 0.1 seconds, the bidirectional forwarding detection (BFD) hello tolerance set to 1 seconds, the IPSEC rekey timer is set to 360 seconds, and double encapsulation enabled. In a scaled network to be scaled up by a factor of 10, the corresponding node may have the hello timer for the node adjusted to 10 seconds, the bidirectional forwarding detection (BFD) hello tolerance set to 100 seconds, the IPSEC rekey timer is set to 36000 seconds, and double encapsulation disabled.

Returning to FIG. 4, at step 420, the network scale emulator may also reconfigure the control plane parameters for each node selected for inclusion in the scaled network. The control plane parameters may include parameters for the various control plane protocols implemented on the source network and/or the nodes of the source network. For example, the control plane parameters may include parameters for various Overlay Management Protocols (OMP), transport location (TLOC) parameters, route parameters, control connection parameters, or the like.

FIG. 6 is a chart illustrating an example scheme for reconfiguring control plane parameters, in accordance with various aspects of the subject technology. The parameters outlined in the chart of FIG. 6 are shown for illustrative purposes. Other embodiments can be implemented in other combinations of parameters, including combinations that exclude, add, or modify certain parameters. FIG. 6 shows how a list of example control plane parameters 605 may be configured. For example, the values for the control plane parameters for a node in a source network are shown in column 610. In an example, scenario, the number of control connections per LAN interface may be set to 2, the affinity towards controllers parameters may be set to 2 controllers per group-list, the number of advertised routes may be 50,000, a restriction parameter may be set to restrict, the TLOC group may be set to public or private based on the customer setup, and the OMP rekey timer may be set to 43200.

The control plane parameters for the scaled network and/or the nodes selected for inclusion in the scaled network should be adjusted to allow the scaled network to better emulate the conditions in the source network. Furthermore, the control plane parameters may be selectively adjusted based on the scale factor to more accurately reconfigure the control plane parameters of each node. For example, in column 615 of the example scheme illustrated in FIG. 5, the corresponding node selected for inclusion in a scaled network to be scaled down by a factor of 10 may have the number of control connections per LAN interface adjusted 40 or to the maximum number allowed by the node if the maximum number allowed is less than 40. The affinity towards controllers parameters may be adjusted by identifying at the total number of controllers and the max number of group-lists (e.g., 100) in the source network. The network scale emulator may assign a controller to each group-list evenly until all of the controllers are assigned and assign all group-lists to the node after identifying the actual number of group-lists.

The number of advertised routes may be increased by a factor of 10 to 500,000 as well. In some cases, the node may have a maximum allowable number of advertised routes that can be supported (e.g., 128,000). If the maximum allowable number is less than the scaled number, the number of advertised routes may be set at the maximum number allowed instead. To reach the desired number of advertised routes, a number of placeholder or dummy IP routes may be injected in order to expand the routing table that needs to be advertised upstream. The restriction parameter may be set to no-restrict or remain at restrict based on the customer use case. The TLOC group may be adjusted to make the same TLOC group on all TLOCs to increase BFD sessions. The OMP rekey timer may be set to 4320 based on the scale factor.

In a scaled network to be scaled up by a factor of 10, the corresponding node parameters may be adjusted in accordance with in column 620 of the example scheme illustrated in FIG. 5. Some of the control plane parameters may not be adjusted. For example, the parameters for the number of control connections per LAN interface, affinity towards controllers, advertised routes, restrictions, or TLOC-Groups may remain the same or similar as the source network. The OMP rekey timer parameter may be set to 432,000 based on the scale factor or to the maximum allowable value if less than 432,000.

According to some embodiments, the network scale emulator may also adjust policy design characteristics of a selected node to better emulate the conditions and behavior of the source network. Doing so takes into consideration the policy level memory scale and helps to simulate the same level of stresses experienced in the source network as in the scaled network. For example, some network nodes may utilize Ternary Content-Addressable Memory (TCAM) to store the hardware level rendering of intents as a series of TCAM entries. However, each node may have a limited amount of TCAM memory and/or may only be able to store a limited number of TCAM entries. Furthermore, the amount of TCAM memory utilized on a network node affects the load and compute overhead of the network node. When scaling down a network, some of the TCAM entries are removed for nodes no longer in the scaled down network. To compensate, the network scale emulator is configured to add placeholder (or dummy) TCAM entries to emulate similar network conditions. For example, if a node selected for inclusion in the scaled network had a TCAM utilization of 80% of the TCAM memory in the source network, the node to be included in the scaled network may have its TCAM memory filled to the same utilization rate (e.g., 80% of the TCAM memory). Furthermore, the TCAM entries may be added to the top or beginning of the TCAM memory since some network nodes process TCAM entries sequentially and adding the placeholder TCAM entries to the beginning of TCAM memory helps to simulate the network conditions of the original network.

Returning to FIG. 4, at step 425, after the various parameters are updated, the network scale emulator may deploy the scaled network.

Figure 7:
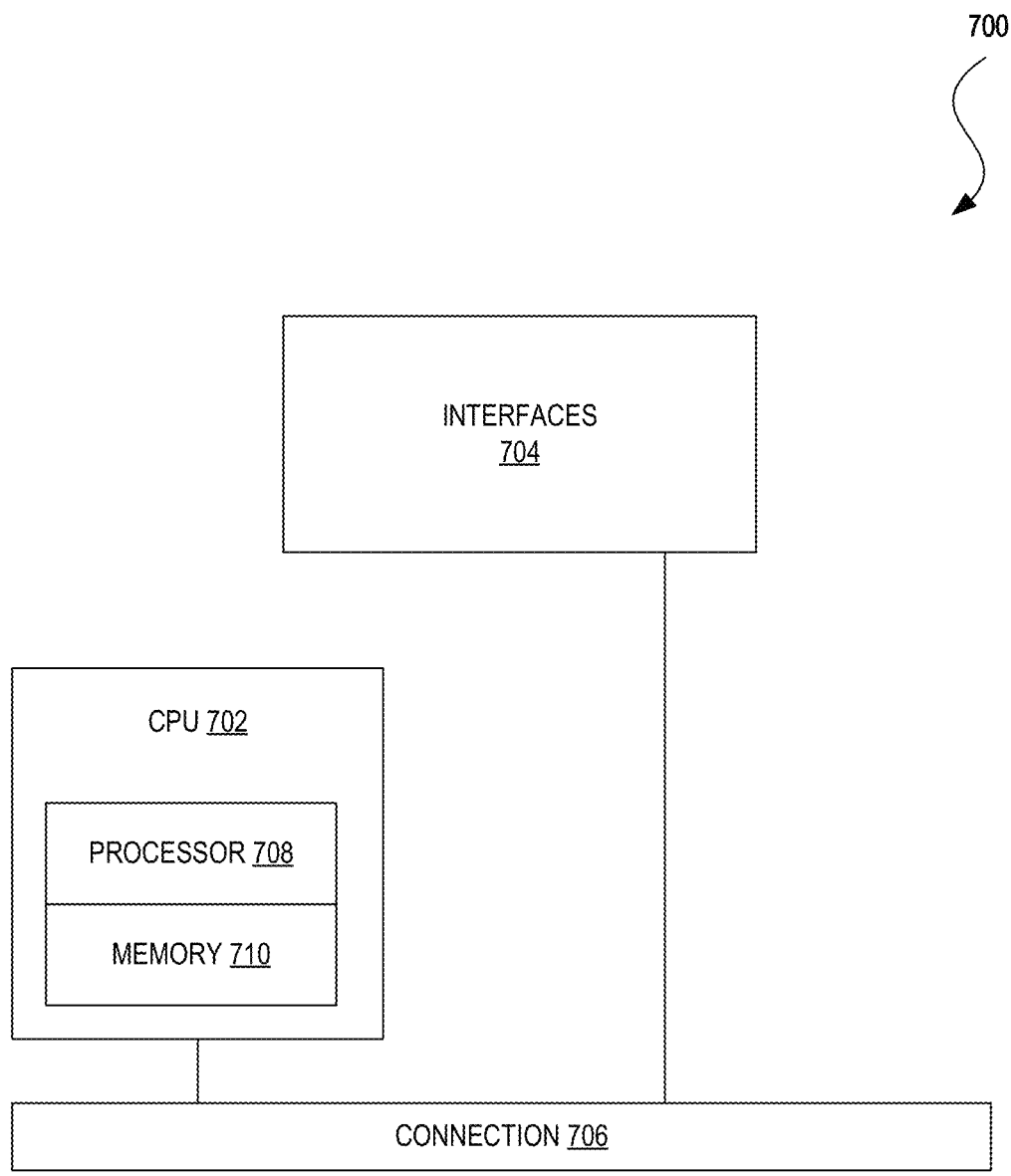
FIG. 7 illustrates an example network device, in accordance with various aspects of the subject technology.
Figure 8:
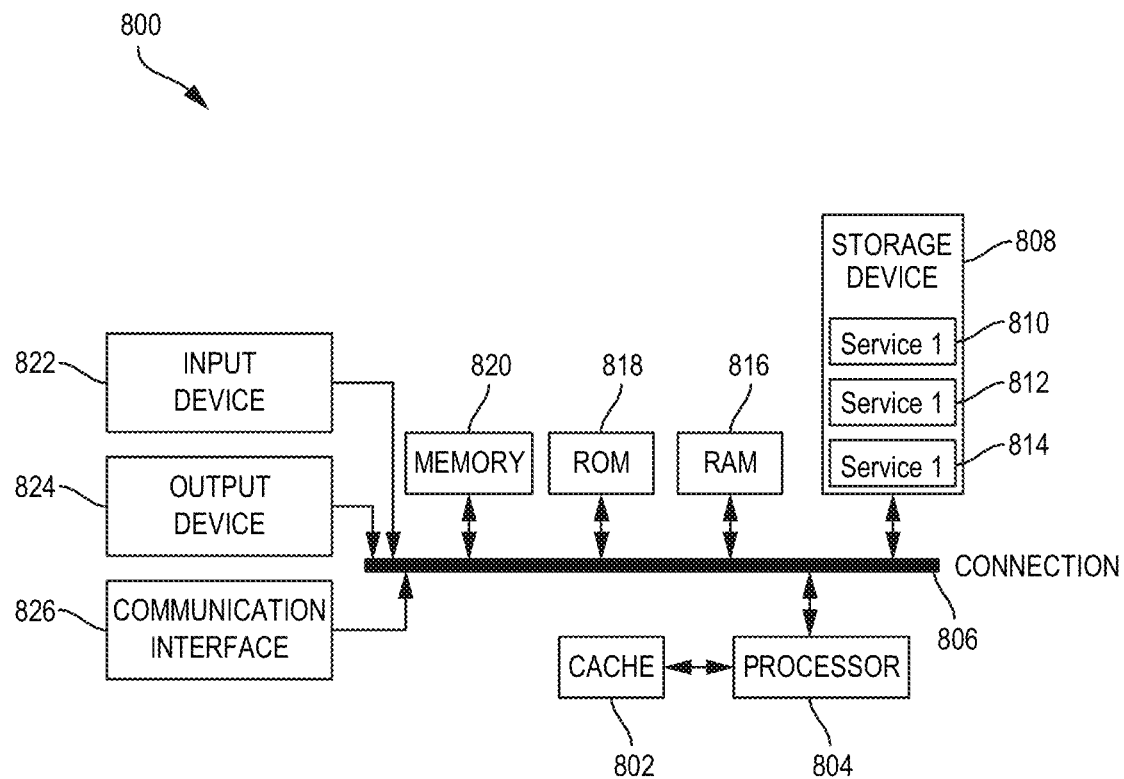
FIG. 8 illustrates an example computing device architecture, in accordance with various aspects of the subject technology.

The disclosure now turns to FIGS. 7 and 8, which illustrate example network devices and computing device architectures, such as switches, routers, client devices, endpoints, servers, and so forth.

FIG. 7 illustrates an example network device 700 suitable for performing switching, routing, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 can accomplish these functions under the control of software including an operating system and any appropriate applications software. CPU 704 may include one or more processors 708, such as a processor from the INTEL X96 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates an example computing system architecture 800 wherein the components of the computing system architecture 800 are in electrical communication with each other using a connection 806, such as a bus. The example computing system architecture 800 includes a processing unit (CPU or processor) 804 and a system connection 806 that couples various system components including the system memory 820, such as read only memory (ROM) 818 and random access memory (RAM) 816, to the processor 804. The computing system architecture 800 can include a cache 802 of high-speed memory connected directly with, in close proximity to, or integrated as part of the processor 804. The computing system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 816, read only memory (ROM) 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving a network configuration for a network and a scale target for a scaled network, wherein the network comprises a plurality of nodes and the scale target is a value that specifies how the network is to be scaled;
identifying, based on the scale target, at least one or more selected nodes of the plurality of nodes in the network for implementing in the scaled network;
reconfiguring, for each node of the one or more selected nodes, data plane parameters of the node; and
reconfiguring, for each node of the one or more selected nodes, control plane parameters of the node.

2. The method of claim 1, further comprising deploying the scaled network.

3. The method of claim 1, wherein the scale target comprises one of a scale factor or a target number of nodes.

4. The method of claim 1, wherein the one or more selected nodes are identified based on one or more topologies of the network.

5. The method of claim 1, further performing a route loop avoidance check.

6. The method of claim 1, wherein the data plane parameters include at least one of a hello timer, an internet protocol security rekey timer, a bidirectional forwarding detection parameters, or a encapsulation parameters.

7. The method of claim 1, wherein the control plane parameters include at least one of a control connection parameter, an advertised route parameter, a restriction parameter, a transport location (TLOC) group parameter, or an overlay management protocol (OMP) timer rekey parameter.

8. The method of claim 1, further comprising reconfiguring, for each node of the one or more selected nodes, policy design parameters for the node.

9. The method of claim 8, wherein reconfiguring of policy design parameters comprises adding placeholder entries to a Ternary Content-Addressable Memory (TCAM) of the node.

10. The method of claim 9, wherein the placeholder entries are added to a beginning of the Ternary Content-Addressable Memory (TCAM) of the node.

11. The method of claim 1, wherein at least one of the data plane parameters or the control plane parameters are reconfigured based on the scale target.

12. A system comprising:
one or more processors; and
at least one computer-readable storage medium having stored therein instructions which, when executed by the one or more processors, cause the one or more processors to:
receive a network configuration for a source network, wherein the source network comprises a plurality of nodes;
receive a scale target for a scaled network, wherein the scale target is a value that specifies how the source network is to be scaled;
identify, based on the scale target, at least one or more selected nodes of the plurality of nodes in the source network for implementing in the scaled network;
reconfigure, for each node of the one or more selected nodes, data plane parameters for the node; and
reconfigure, for each node of the one or more selected nodes, control plane parameters for the node.

13. The system of claim 12, wherein the instructions further cause the one or more processors to deploy the scaled network.

14. The system of claim 12, wherein the scale target comprises one of a scale factor or a target number of nodes.

15. The system of claim 12, wherein the one or more selected nodes are identified based on one or more topologies of the source network.

16. The system of claim 12, wherein the instructions further cause the one or more processors to reconfigure, for each node of the one or more selected nodes, policy design parameters for the node, wherein reconfiguring of policy design parameters comprises adding placeholder entries to a Ternary Content-Addressable Memory (TCAM) of the node.

17. The system of claim 12, wherein at least one of the data plane parameters or the control plane parameters is reconfigured based on the scale target.

18. A non-transitory computer-readable storage medium having stored therein instructions which, when executed by a processor, cause the processor to:
receive a network configuration for a source network, wherein the source network comprises a plurality of nodes;
receive a scale target for a scaled network, wherein the scale target is a value that specifies how the source network is to be scaled;
identify, based on the scale target, at least one or more selected nodes of the plurality of nodes in the source network for implementing in the scaled network; and
reconfigure data plane parameters and control plane parameters of each node of the one or more selected nodes.

19. The non-transitory computer-readable storage medium of claim 18, wherein the instructions further cause the processor to deploy the scaled network.

20. The non-transitory computer-readable storage medium of claim 18, wherein at least one of the data plane parameters or the control plane parameters is reconfigured based on the scale target.

* * * * *